(12) United States Patent
Christensen et al.

(10) Patent No.: US 12,461,573 B2
(45) Date of Patent: Nov. 4, 2025

(54) ADD-IN-CARD FOR AN INFORMATION HANDLING SYSTEM

(71) Applicant: Dell Products L.P., Round Rock, TX (US)

(72) Inventors: Steven Michael Christensen, Austin, TX (US); Keith Jay Lambright, Round Rock, TX (US); Yimin Xiao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 458 days.

(21) Appl. No.: 18/167,968

(22) Filed: Feb. 13, 2023

(65) Prior Publication Data

US 2024/0272685 A1    Aug. 15, 2024

(51) Int. Cl.
*G06F 1/18* (2006.01)
(52) U.S. Cl.
CPC .................................. *G06F 1/185* (2013.01)
(58) Field of Classification Search
CPC ...................................................... G06F 1/185
USPC ........................................................... 361/792
See application file for complete search history.

(56) References Cited

U.S. PATENT DOCUMENTS

| | | | |
|---|---|---|---|
| 11,778,743 B2* | 10/2023 | Marshall | G06F 1/185 361/748 |
| 2002/0034068 A1* | 3/2002 | Weber | H05K 1/144 361/720 |
| 2002/0080541 A1* | 6/2002 | Bunker | G06F 1/185 361/72 |
| 2016/0335220 A1* | 11/2016 | Breakstone | G06F 1/185 |
| 2020/0045843 A1* | 2/2020 | Schramm | G06F 1/185 |
| 2022/0360002 A1* | 11/2022 | Li | H01R 13/2407 |

* cited by examiner

*Primary Examiner* — Timothy J Thompson
*Assistant Examiner* — Michael F McAllister
(74) *Attorney, Agent, or Firm* — McDermott Will & Schulte LLP

(57) ABSTRACT

An information handling system, including: a printed circuit board (PCB) including: a storage device connector, a first sideband connector, and an add-in-card (AIC), including: a paddle board connector, a paddle board coupled to the paddle board connector; an expansion slot; and a second sideband connector, wherein when the paddle board is coupled to the storage device connector, the AIC is co-planar with the PCB.

20 Claims, 6 Drawing Sheets

ADD-IN-CARD FOR AN INFORMATION HANDLING SYSTEM

BACKGROUND

Field of the Disclosure

The disclosure relates generally to an information handling system, and in particular, an add-in-card for the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in an information handling system, including: a printed circuit board (PCB) including: a storage device connector; a first sideband connector; and an add-in-card (AIC), including: a paddle board connector; a paddle board coupled to the paddle board connector; an expansion slot; and a second sideband connector, wherein when the paddle board is coupled to the storage device connector, the AIC is co-planar with the PCB.

Other embodiments of these aspects include corresponding systems and apparatus.

These and other embodiments may each optionally include one or more of the following features. For instance, the PCB further including a first connector and a second connector, the second connector spaced-apart from the first connector a first distance, wherein when the paddle board is coupled to the storage device connector, the expansion slot is spaced-apart from the second connector the first distance. The PCB includes a notch extending a length of a portion of a first side of the PCB. When the paddle board is coupled to the storage device connector, a portion of the AIC is positioned within the notch. When the paddle board is coupled to the storage device connector, a portion of the AIC is adjacent to the notch. When the paddle board is coupled to the storage device connector, the second sideband connector of the AIC is coupled to the first sideband connector of the PCB through a jumper connector to provide power and sideband signals from the PCB to the AIC. The storage device connector is a M.2 connector. The paddle board connector is a right angled SSD connector. The storage device connector is positioned proximate to the notch. The storage device connector is positioned proximate to the first side of the PCB. The expansion slot is a peripheral component interconnect extended (PCI-X) expansion slot. The expansion slot is a peripheral component interconnect express (PCIe) expansion slot. When the paddle board is coupled to the storage device connector, the paddle board provides communication of signals between the PCB and the expansion slot.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
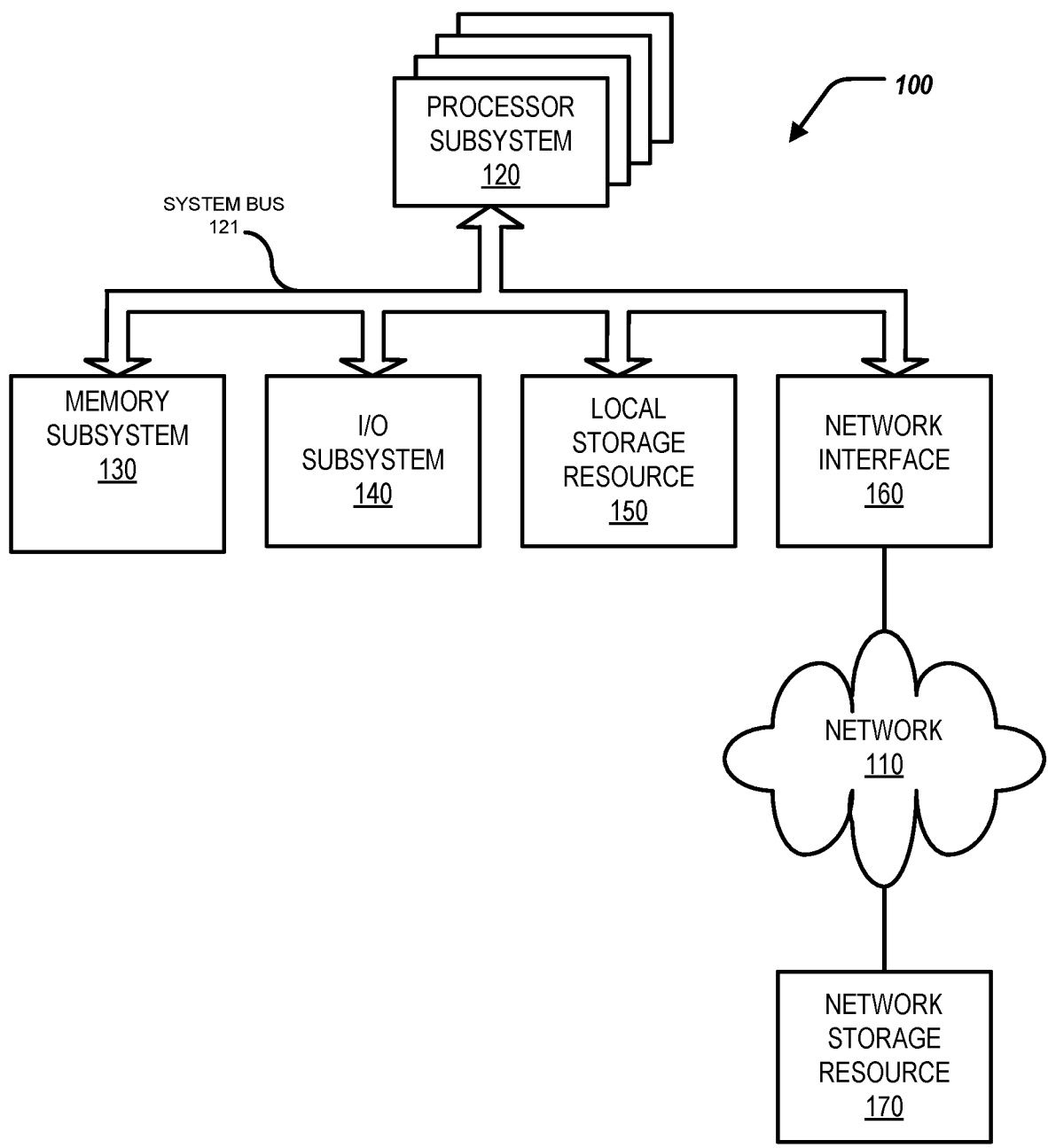
FIG. 1 is a block diagram of selected elements of an embodiment of an information handling system.

This disclosure discusses an add-in-card for an information handling system. In short, a storage connector of a printed circuit board (PCB) (or motherboard) can be utilized to provide an additional optional expansion slot for computing cards. Specifically, a M.2 connector on the PCB can be coupled with a paddle card connector of an add-in-card (AIC). The AIC can be co-planar with the PCB, and the PCB can include a notch to enable proper spacing of the expansion slot of the AIC and computing card slots of the PCB. Additionally, a sideband connector is utilized to provide power and sideband signals to the AIC.

Specifically, this disclosure discusses an information handling system, including: a printed circuit board (PCB) including: a storage device connector; a first sideband connector; and an add-in-card (AIC), including: a paddle board connector; an expansion slot; and a second sideband connector, wherein when the paddle board connector is coupled to the storage device connector, the AIC is co-planar with the PCB.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, a storage connector of a printed circuit board (PCB) (or motherboard) can be utilized to provide an additional optional expansion slot for computing cards. Specifically, a M.2 connector on the PCB can be coupled with a paddle card connector of an add-in-card (AIC). The AIC can be co-planar with the PCB, and the PCB can include a notch to enable proper spacing of the expansion slot of the AIC and computing card slots of the PCB. Additionally, a sideband connector is utilized to provide power and sideband signals to the AIC.

Figure 2:
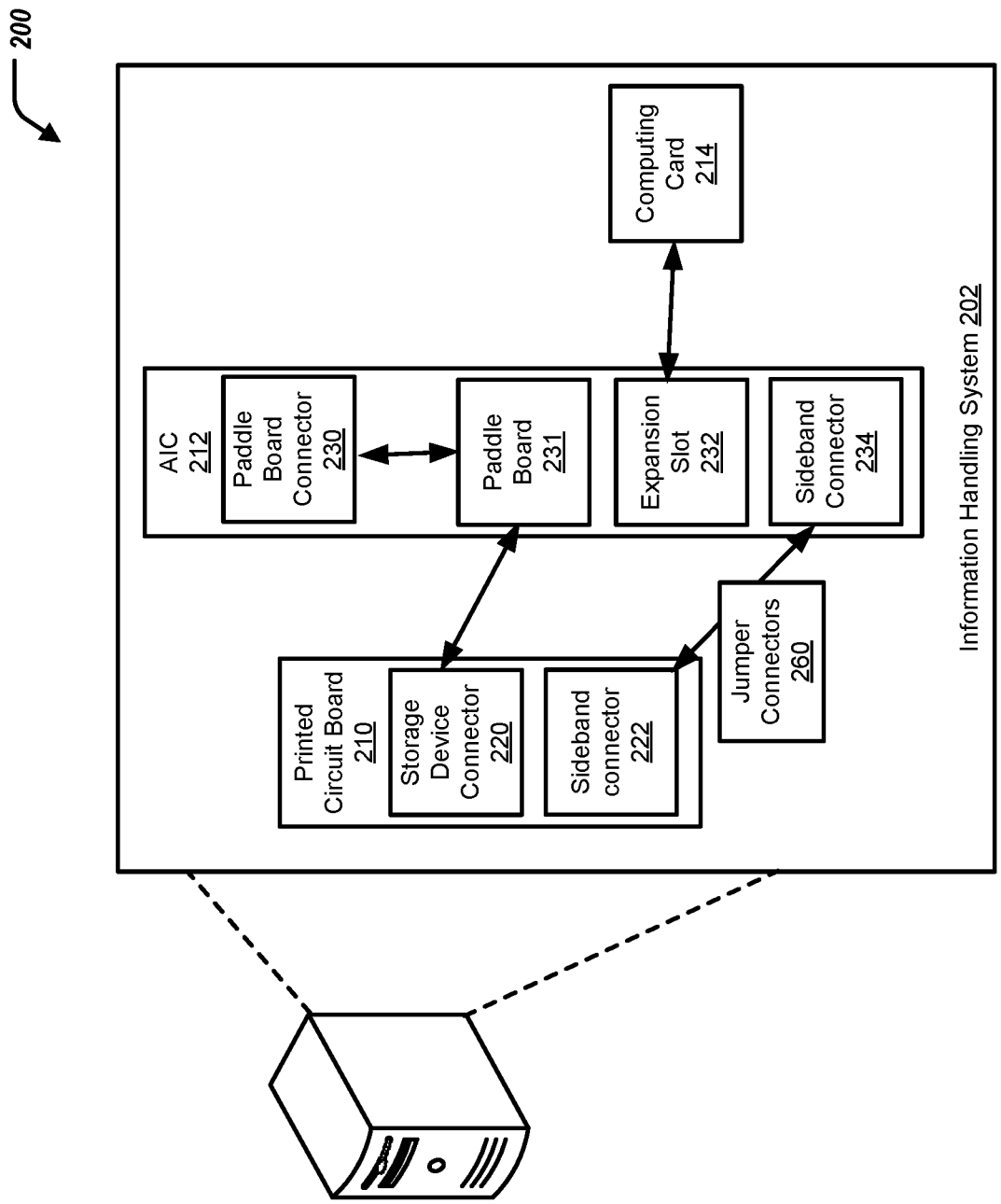
FIG. 2 illustrates a block diagram of an information handling system, including an add-in-card (AIC).

Turning to FIG. 2, FIG. 2 illustrates an environment 200 including an information handling system 202. The information handling system 202 can include a printed circuit board (PCB) 210, an add-in-card (AIC) 212, and a computing card 214. In some examples, the information handling system 202 is similar to, or includes, the information handling system 100 of FIG. 1. In some examples, the information handling system 202 includes the AIC 212 and the computing card 214. In some examples, the AIC 212 and the computing card 214 are included by the environment 200. In some examples, the AIC and the computing card 214 are "outside" of the information handling system 202.

The PCB 210 can include a storage device connector 220 and a sideband connector 222. The AIC 212 can include a paddle board connector 230, a paddle board 231, an expansion slot 232, and a sideband connector 234. The PCB 210 can be in communication with the AIC 212. The AIC 212 can be in communication with the PCB 210 and the computing card 214. The computing card 214 can be in communication with the AIC 212.

The computing card 214 can be removably coupled to the AIC 212, and in particular, the expansion slot 232 of the AIC 212. That is, the computing card 214 can be physically inserted into/coupled to the expansion slot 232. The computing card 214 can communicate with (transmit signals to/receive signals from) the PCB 210 through the paddle board connector 230, the paddle board 231, and the storage device connector 220; and through the jumper connector 260 and the sideband connectors 222, 234.

The paddle board 231 can be coupled with the paddle board connector 230. Further, when the AIC 212 is coupled with the PCB 210, the paddle board connector 230 is further coupled to the storage device connector 220.

When the AIC 212 is coupled with the PCB 210, the sideband connectors 222, 234 can be coupled through the jumper connector 260.

Figure 3:
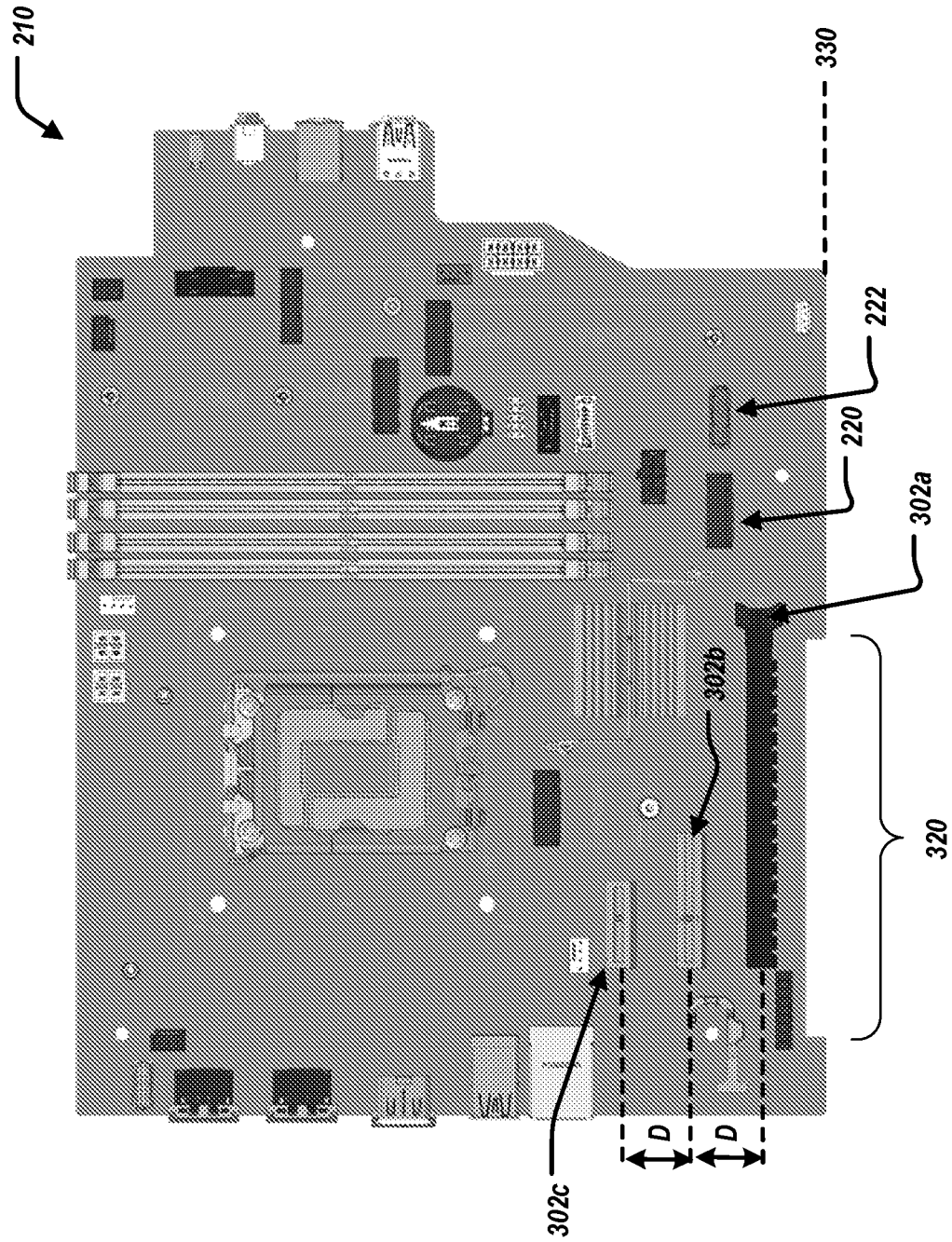
FIG. 3 illustrates a top down view of a printed circuit board (PCB) of the information handling system.

FIG. 3 illustrates a top down view of the PCB 210. The PCB 210 can include the storage device connector 220 and the sideband connector 222. In some examples, the storage device connector 220 is a solid-state drive (SSD) connector. In some examples, the storage device connector 220 is a M.2 connector.

The PCB 210 can further include a plurality of additional connectors, shown as a first connector 302a, a second connector 302b, and a third connector 302c (collectively referred to as connectors 302); however, the PCB 210 can include any number of additional connectors. In some examples, each of the connectors 302 can be space-apart from one another (e.g., "pitch") a same distance (e.g., distance D). In some examples, the distance D is approximately 0.8 inches.

In some examples, the PCB 210 includes a notch 320 extending a length of a portion of a first side 330 of the PCB 210. In some examples, the PCB 210 is initially formed with the notch 320. In some examples, the notch 320 is formed in the PCB 210 at a later time. For example, a portion of the PCB 210 can be removed to form the notch 320. Further, any traces can be re-routed that were previously included in the removed portion of the PCB 210.

In some examples, the storage device connector 220 is positioned proximate to the notch 320, and further, proximate to the first side 330 of the PCB 210.

Figure 4B:
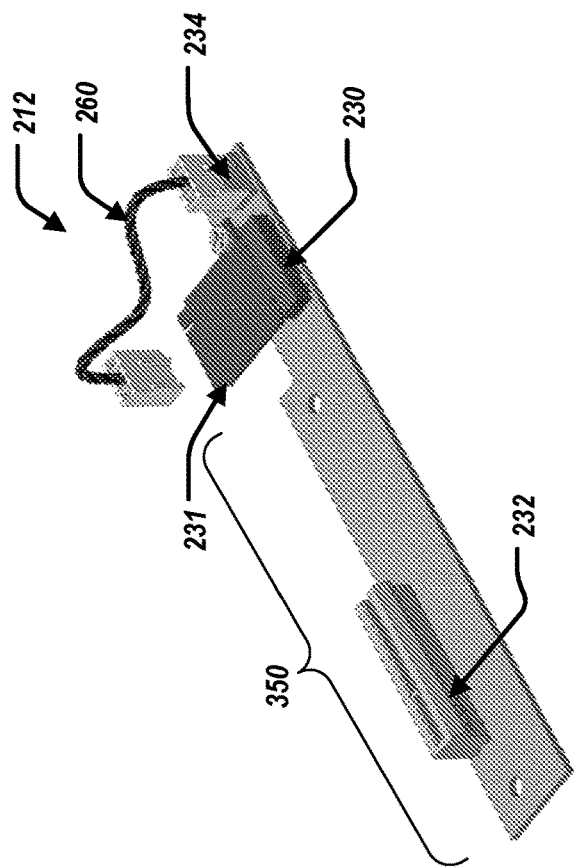
FIG. 4B illustrates a perspective view of a second example of the AIC.
Figure 4A:
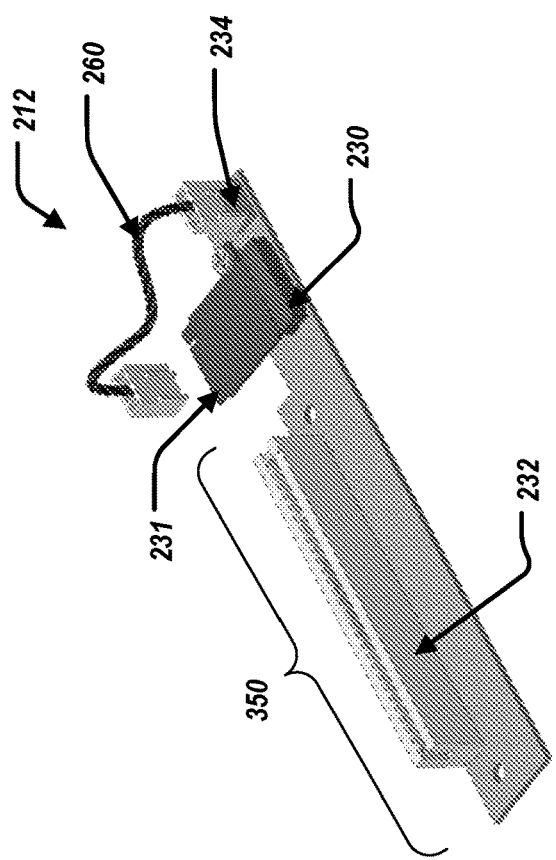
FIG. 4A illustrates a perspective view of a first example of the AIC.

FIG. 4A illustrates a perspective view of a first example of the AIC 212; and FIG. 4B illustrates a perspective view of a second example of the AIC 212. The AIC 212 can include the paddle board connector 230, the paddle board 231, the expansion slot 232, and the sideband connector 234. The paddle board 231 is coupled to the paddle board connector 230. The jumper connector 260 is coupled to the sideband connector 234. In some examples, the paddle board connector 230 is a right angled SSD connector. In some examples, the paddle board connector 230 is a M.2 connector. In some examples, the paddle board 231 is a SSD. In some examples, the paddle board 231 is a M.2 device. In some examples, the expansion slot 232 is a peripheral component interconnect extended (PCI-X) expansion slot, as shown in FIG. 4A. In some examples, the expansion slot 232 is peripheral component interconnect express (PCIe) expansion slot (x4 or x1), as shown in FIG. 4B.

Figure 5:
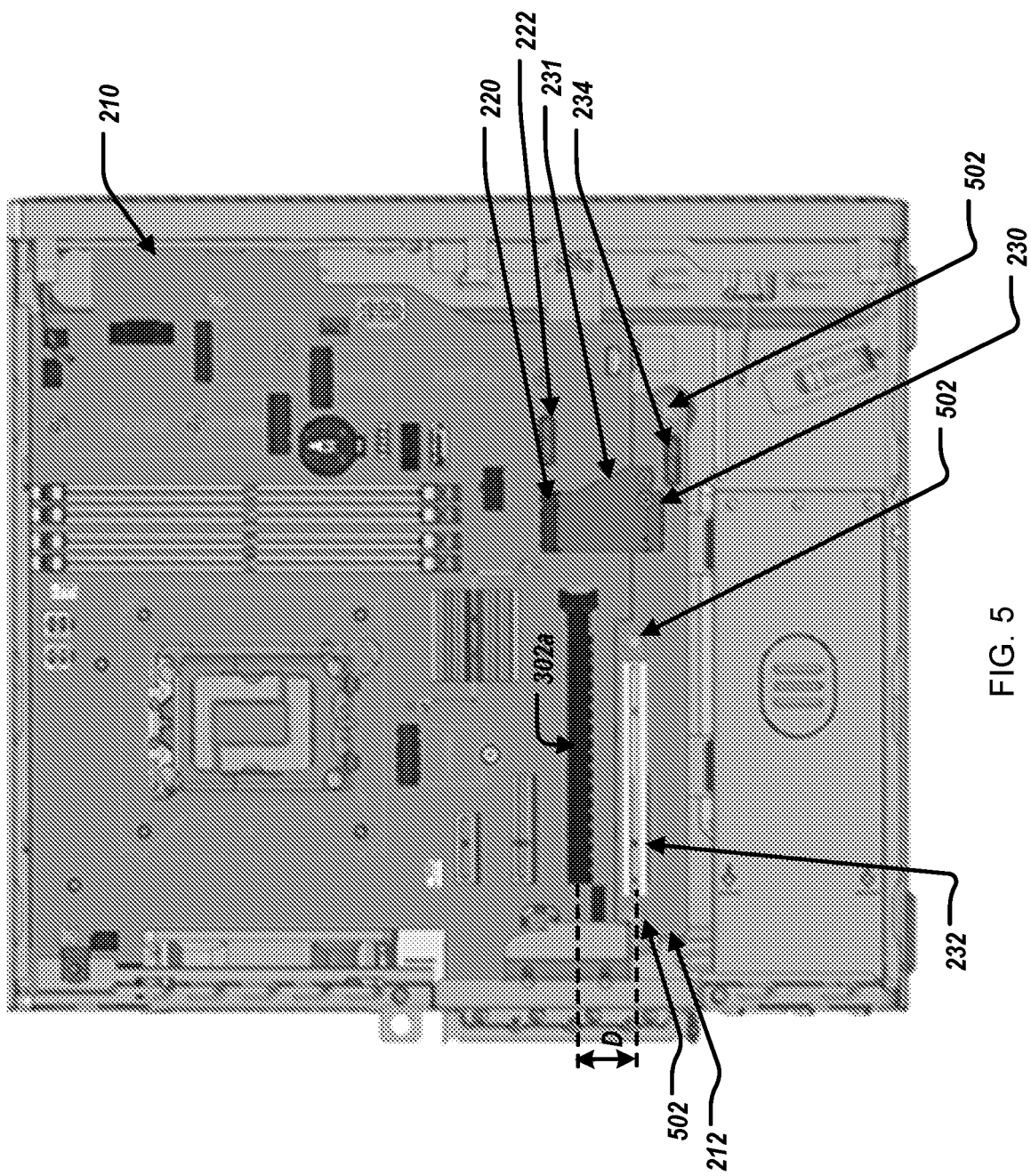
FIG. 5 illustrates a top down view of the AIC coupled to the PCB.
Figure 6:
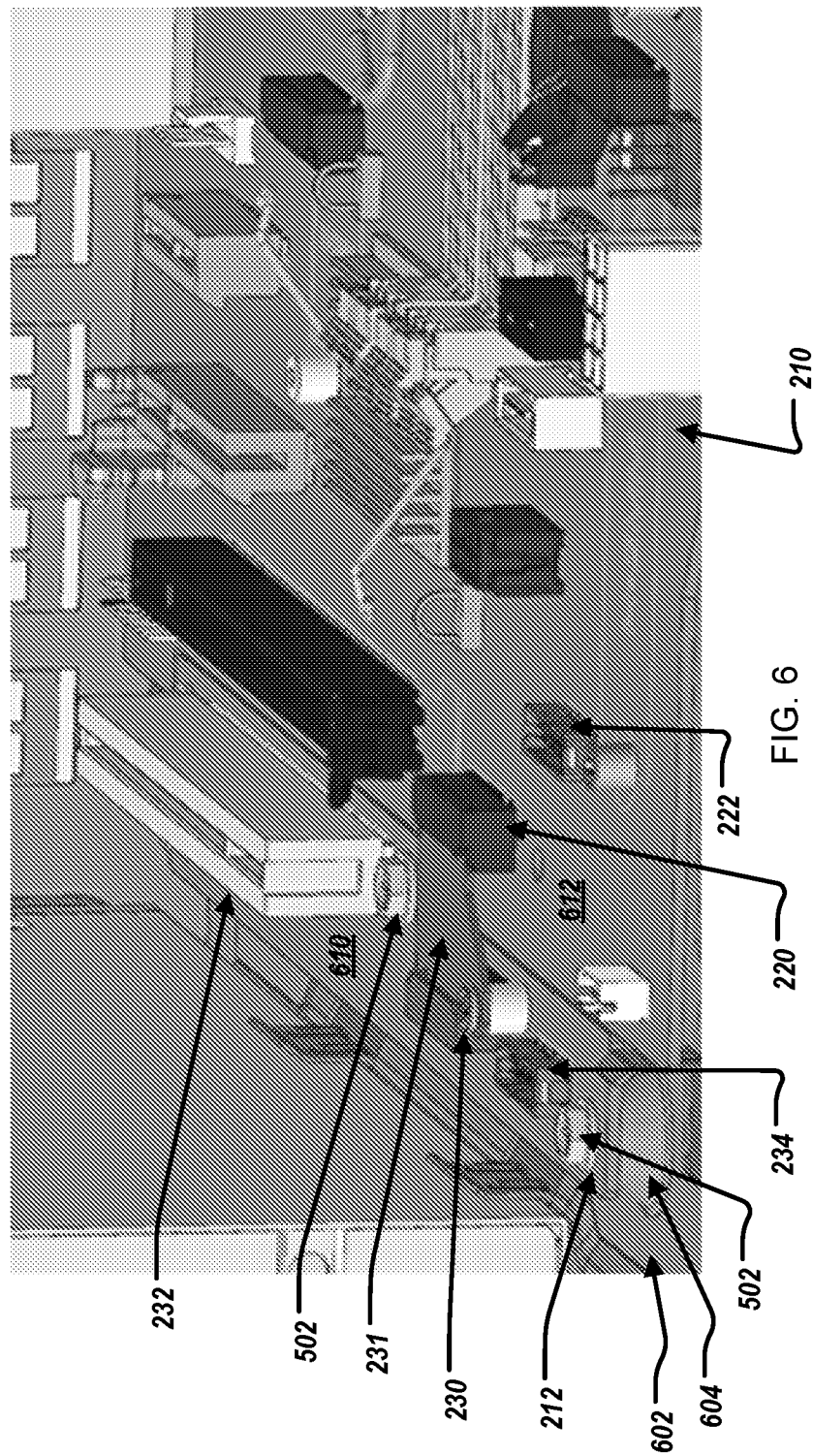
FIG. 6 illustrates a perspective view of the AIC coupled to the PCB.

FIG. 5 illustrates a top down view of the AIC 212 coupled to the PCB 210; and FIG. 6 illustrates a perspective view of the AIC 212 coupled to the PCB 210. In some examples, a cover 602 (of the information handling system 202) can include coupling members 604. When the AIC 212 is coupled to the PCB 210, fasteners 502 are threadably coupled with the coupling members 604 to couple the AIC 212 to the cover 602. The cover 602 can include any number of coupling members 604.

When the AIC 212 is coupled to the PCB 210, the paddle board 232 of the AIC 212 is coupled to the storage device connector 220 of the PCB 210 (while also being coupled to the paddleboard connector 230 of the AIC 212). To that end, when the paddle board 231 of the AIC 212 is coupled to the storage device connector 220 of the PCB 210, the AIC 212 is co-planar with the PCB 210. That is, the AIC 212 and the PCB 210 lay in the same plane. In other words, a surface 610 of the AIC 212 is substantially co-planar with a surface 612 of the PCB 210. In some examples, the coupling members 604 of the cover 602 extend from the cover 602 to facilitate the AIC 212 and the PCB 210 laying in the same plane. That is, each of the coupling members 604 extends a distance from the cover 602 such that when the AIC 212 is coupled to the cover 602 via the fasteners 502, the AIC 212 and the PCB 210 lay in the same plane. That is, the AIC 212 is positioned on the coupling members 604 such that when the AIC 212 is coupled to the cover 602 via the fasteners 502, the AIC 212 and the PCB 210 lay in the same plane.

Furthermore, when the paddle board 231 of the AIC 212 is coupled to the storage device connector 220 of the PCB 210, the expansion slot 232 is spaced-apart from the first connector 302a the distance D. That is, the spacing (or pitch) between each of the connectors 302 and between the first connector 302a and the expansion slot 232 is substantially the same—the distance D. For examples, the spacing (or pitch) between each the first connector 302a and the expansion slot 232 is approximately 0.8 inches.

Furthermore, when the paddle board 231 of the AIC 212 is coupled to the storage device connector 220 of the PCB 210 (and coupled to the paddle board connector 230 of the AIC 212), a portion of the AIC 212 is positioned within the notch 320 (shown in FIG. 3). That is, a portion of the AIC 212 is adjacent to the notch 320. For example, the portion 350 of the AIC 212, shown in FIGS. 4A and 4B, is positioned within the notch 320, and adjacent to the notch 320. To that end, positioning the portion 350 of the AIC 212 within the notch 320 enables (or facilitates) the spacing (or pitch) between the first connector 302a and the expansion slot 232 to be the distance D.

Additionally, when the paddle board 231 of the AIC 212 is coupled to the storage device connector 220 of the PCB 210 (and coupled to the paddle board connector 230 of the AIC 212), the sideband connector 234 of the AIC 212 is coupled to the sideband connector 222 of the PCB 210 through the jumper connector 260 (not shown for simplicity of illustration). The jumper connector 260 can be coupled to the sideband connectors 222, 234. When the sideband connector 234 of the AIC 212 is coupled to the sideband connector 222 of the PCB 210, power can be provided to the AIC 212 (e.g., 25 Watts) and sideband signals can be transmitted between the AIC 212 and the PCB 210 through the jumper connector 260 and the sideband connector 234 and the sideband connector 222.

Additionally, when the paddle board connector 230 of the AIC 212 is coupled to the storage device connector 220 of the PCB 210 (and coupled to the paddle board connector 230 of the AIC 212), the paddle board connector 230 and the paddle board 231 provide a communication channel (of signals) between the PCB 210 and the expansion slot 232. That is, the computing card 214 that is coupled to the expansion slot 232 can communicate with the PCB 210 through the paddle board connector 230, the paddle board 231, and the storage device connector 220.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. An information handling system, including:
  a printed circuit board (PCB) including:
    a storage device connector;
    a first sideband connector; and
  an add-in-card (AIC), including:
    a paddle board connector;
    a paddle board coupled to the paddle board connector;
    an expansion slot; and
    a second sideband connector,
  wherein when the paddle board is coupled to the storage device connector, the AIC is co-planar with the PCB.
2. The information handling system of claim 1, the PCB further including a first connector and a second connector, the second connector spaced-apart from the first connector a first distance, wherein when the paddle board is coupled to the storage device connector, the expansion slot is spaced-apart from the second connector the first distance.
3. The information handling system of claim 1, wherein the PCB includes a notch extending a length of a portion of a first side of the PCB.
4. The information handling system of claim 3, wherein when the paddle board is coupled to the storage device connector, a portion of the AIC is positioned within the notch.

5. The information handling system of claim 3, wherein when the paddle board is coupled to the storage device connector, a portion of the AIC is adjacent to the notch.

6. The information handling system of claim 1, wherein when the paddle board is coupled to the storage device connector, the second sideband connector of the AIC is coupled to the first sideband connector of the PCB through a jumper connector to provide power and sideband signals from the PCB to the AIC.

7. The information handling system of claim 1, wherein the storage device connector is a M.2 connector.

8. The information handling system of claim 1, wherein the paddle board connector is a right angled SSD connector.

9. The information handling system of claim 3, wherein the storage device connector is positioned proximate to the notch.

10. The information handling system of claim 3, wherein the storage device connector is positioned proximate to the first side of the PCB.

11. The information handling system of claim 1, wherein the expansion slot is a peripheral component interconnect extended (PCI-X) expansion slot.

12. The information handling system of claim 1, wherein the expansion slot is a peripheral component interconnect express (PCIe) expansion slot.

13. The information handling system of claim 1, wherein when the paddle board is coupled to the storage device connector, the paddle board provides communication of signals between the PCB and the expansion slot.

14. A computing environment, including:
an information handling system, including:
a printed circuit board (PCB) including:
a storage device connector;
a first sideband connector; and
an add-in-card (AIC), including:
a paddle board connector;
a paddle board coupled to the paddle board connector;
an expansion slot; and
a second sideband connector,
wherein when the paddle board is coupled to the storage device connector, the AIC is co-planar with the PCB.

15. The computing environment of claim 14, the PCB further including a first connector and a second connector, the second connector spaced-apart from the first connector a first distance, wherein when the paddle board is coupled to the storage device connector, the expansion slot is spaced-apart from the second connector the first distance.

16. The computing environment of claim 14, wherein the PCB includes a notch extending a length of a portion of a first side of the PCB.

17. The computing environment of claim 16, wherein when the paddle board is coupled to the storage device connector, a portion of the AIC is positioned within the notch.

18. The computing environment of claim 16, wherein when the paddle board is coupled to the storage device connector, a portion of the AIC is adjacent to the notch.

19. The computing environment of claim 14, wherein when the paddle board is coupled to the storage device connector, the second sideband connector of the AIC is coupled to the first sideband connector of the PCB through a jumper connector to provide power and sideband signals from the PCB to the AIC.

20. An information handling system, including:
a printed circuit board (PCB) including:
a storage device connector;
a first sideband connector;
a first connector;
a second connector, wherein the second connector is spaced-apart from the first connector a first distance; and
a notch extending a length of a portion of a first side of the PCB;
an add-in-card (AIC), including:
a paddle board connector;
a paddle board coupled to the paddle board connector;
an expansion slot; and
a second sideband connector,
wherein when the paddle board is coupled to the storage device connector, i) the AIC is co-planar with the PCB, ii) a portion of the AIC is positioned within the notch, and iii) the expansion slot is spaced-apart from the first connector the first distance.

* * * * *